Oct. 7, 1924.  
G. L. CURLE  
1,510,659  
MAIN AND AUXILIARY MELTING POT FOR LINOTYPE MACHINES  
Filed Jan. 6, 1923   2 Sheets-Sheet 1
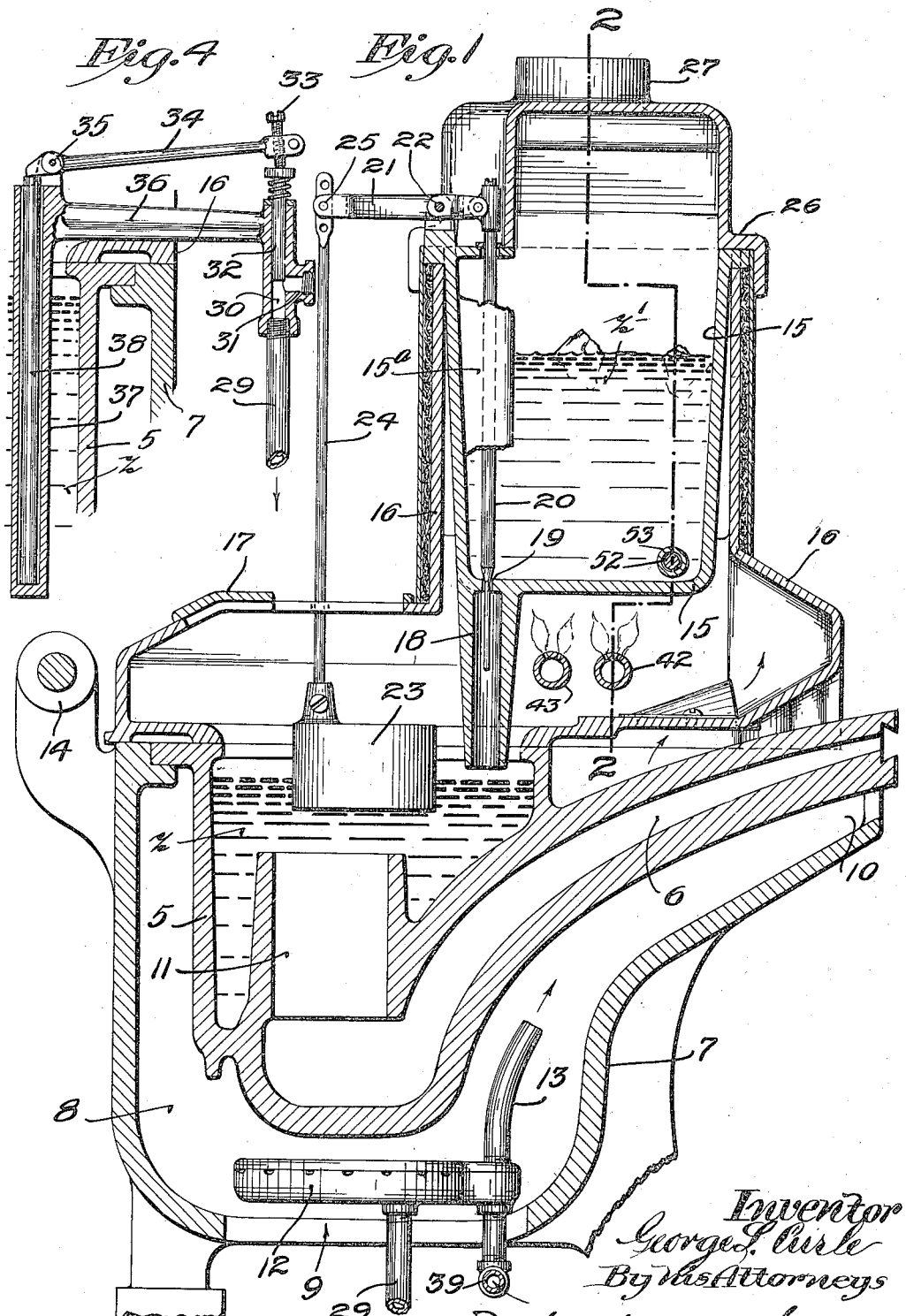

Oct. 7, 1924. 1,510,659
G. L. CURLE
MAIN AND AUXILIARY MELTING POT FOR LINOTYPE MACHINES
Filed Jan. 6, 1923 2 Sheets-Sheet 2
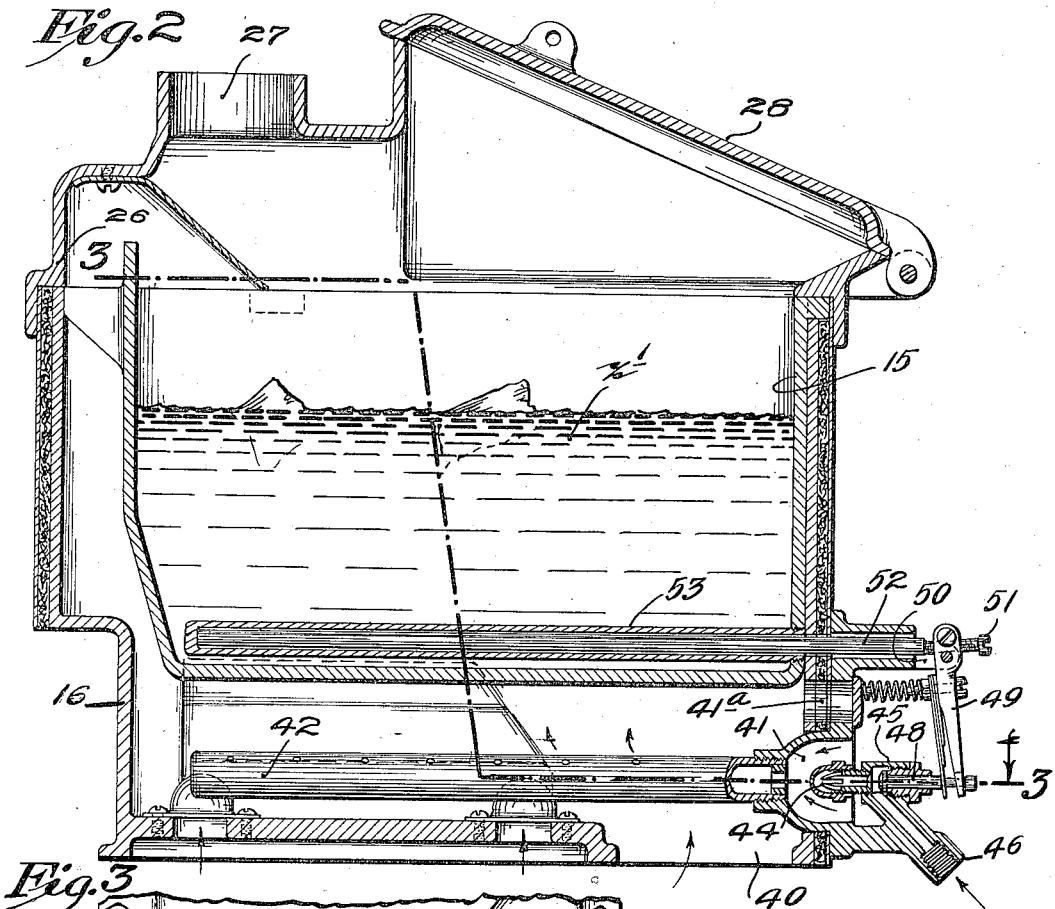
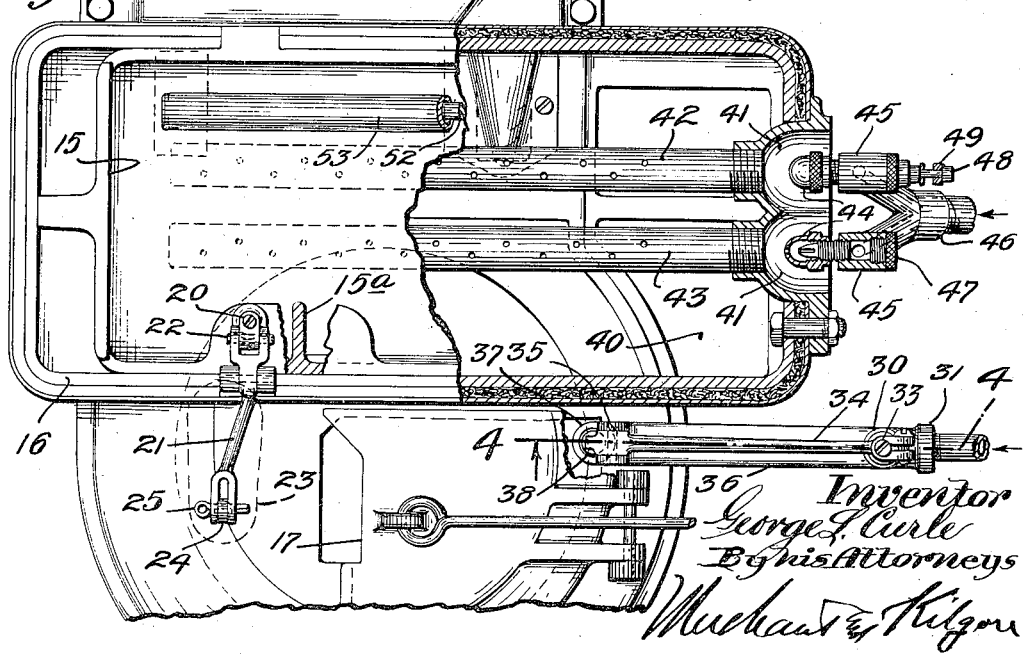

Patented Oct. 7, 1924.

1,510,659

UNITED STATES PATENT OFFICE.

GEORGE L. CURLE, OF MINNEAPOLIS, MINNESOTA.

MAIN AND AUXILIARY MELTING POT FOR LINOTYPE MACHINES.

Application filed January 6, 1923. Serial No. 611,082.

*To all whom it may concern:*

Be it known that I, GEORGE L. CURLE, a citizen of the United States, residing at Minneapolis, in the county of Hennepin and State of Minnesota, have invented certain new and useful Improvements in Main and Auxiliary Melting Pots for Linotype Machines; and I do hereby declare the following to be a full, clear, and exact description of the invention, such as will enable others skilled in the art to which it appertains to make and use the same.

My invention relates to linotype machines, such, for example, as the well known Mergenthaler linotype, and has for its object to improve the melting pot structure and the operation thereof with a view of obtaining not only better type bars but also economy in the operation thereof and in the use of the type metal.

The melting pot of this application is in the nature of an improvement or refinement of the melting pot disclosed and broadly claimed in my pending application, S. N. 498,326, filed Sept. 3, 1921, entitled "Main and auxiliary melting pot for linotype machines."

In the accompanying drawings, which illustrate the invention, like characters indicate like parts throughout the several views.

Referring to the drawings:

Fig. 1 is a vertical section taken centrally through the improved melting pot structure;

Fig. 2 is a view partly in plan with some parts removed and partly in horizontal section taken approximately on the line 2—2 of Fig. 1;

Fig. 3 is a transverse vertical section taken approximately on the line 3—3 of Fig. 2; and Fig. 4 is a fragmentary section taken on the line 4—4 of Fig. 3.

The main melting pot 5, which may be of the usual or any suitable type, has the customary discharge spout 6. The melting pot 5 is secured to and contained within a metallic housing or outer casing 7 that is spaced therefrom to form a combustion chamber 8 having an air intake passage 9 and a flame discharge passage 10. The melting pot and its housing have a slight movement toward and from the mold, not shown, but which mold will be aligned with the metal discharge spout 6. The discharge of the metal through the spout 6 will be controlled by a piston, not shown, but which will work in the customary cylinder 11.

The main melting pot just described is, in the construction illustrated, arranged to be heated by a main gas burner 12 and an auxiliary gas burner 13, both of which are located within the combustion chamber 8 and receive the gas supply through suitable gas pipe connections to a source of gas supply.

The housing 7, together with the main melting pot and various other parts hereinafter described and including the auxiliary melting pot, are adapted to be moved on suitable supports, such, for example, as found in the Mergenthaler linotype machine, and, as shown, the housing 7 is provided at its back with a lug equipped with a roller 14 against which an operating cam, not shown, will, in practice, be arranged to run.

The auxiliary melting pot 15 is mounted in an outer casing or housing 16 that is rigidly secured on and forms an upward extension of the housing or casing 7 and, hence, of course, moves therewith. The base of the housing 16 is expanded to fit the top of the lower housing 7 and is provided with a normally closed door 17, which, when raised, affords access to the interior of the main pot 5. The character Z indicates molten type metal contained in said main pot and the character $Z^1$ indicates molten type metal contained within the auxiliary pot 15. The auxiliary pot 15 has a depending discharge spout 18, the lower end of which extends down into the main melting pot 5 and below the possible high level of the metal Z, this being done for an important purpose which will presently appear. The discharge spout 18 is connected to the interior of the auxiliary pot 15 through a port 19 that is normally closed by a needle valve 20, the upper end of which extends through the top flange of the pot 15 and is pivotally connected to the inner end of a lever 21 that is intermediately pivoted at 22 to a lug on the pot 15. The numeral 23 indicates a float that is partly emersed in the molten metal Z of the main pot and is provided with an upwardly extended stem 24, which, as shown, is pivotally and adjustably connected at 25 to the outer end of the lever 21.

The auxiliary pot 15, in the construction illustrated, is provided with a detachable hood 26 formed with a gas discharge flue 27 and with a hinged top door 28, which latter, when raised, permits the slugs or solid tight metal to be readily introduced into the auxiliary pot.

In the preferred arrangement, the gas supply to the burner 12 is automatically controlled by a thermally actuated valve controller and its supply pipe 29, (see Figs. 1 and 4), is extended to a sort of a T-coupling head 30, the lateral branch 31 of which will be connected to the gas supply pipe. Working in the head 30 is a spring-retracted plunger-like valve 32, the outer end of which is subject to a presser screw 33 carried by the free end of an arm 34, which latter is pivoted at 35 to an upstanding lug of a bracket 36 that is rigidly secured on the rim of the melting pot 5. The bracket 36, at its inner end, has a depending tube 37 that extends down into the molten metal Z and is closed at its lower end. Within the tube 37 is an expansion rod 38, the upper end of which engages the short inner end of the valve-actuating arm 34.

The auxiliary burner 13 may be used as a pilot and receive its gas supply through a pipe 39, but need not be automatically controlled. The adjustment of the screw 33 and arm 34 will be such that expansion of the rod 38 will either cut entirely off or cut down the flame from the main burner 12 whenever the temperature of the molten metal Z in the main pot 5 exceeds or tends to exceed the predetermined desired temperature.

For heating the auxiliary melting pot 15, I preferably provide two burners, one of which will be automatically controlled by a thermally actuated valve actuator. In the construction illustrated, the housing 16, at its bottom, projects at its ends beyond the main housing 7, to which it is secured, and at one end is provided with a large air intake port 40, (see Fig. 3). At the same end, below the auxiliary pot 15, the housing 16 is provided with a duplex flame cup 41 and with a pair of horizontally projecting parallel perforated burner tubes 42 and 43. Adjustable burner tips 44 are supported by hollow heads 45 of a forked gas supply pipe 46. The heads 45 are shown as provided at their outer ends with plugs 47. For opening and closing the passage to the burner tip tube 42 is a plunger-like valve 48, that is connected to the free end of a spring-retracted arm 49 that is pivoted to a lug 50 on the housing 16, (see Fig. 3). The short upper end of the arm 49 is provided with a presser screw 51 that engages the outer end of an expansion rod 52. The expansion rod 52 is located within a tube 53 that is anchored at its open end to one side of the auxiliary pot 15 and is closed at its other end. Said tube 53 is emersed in the molten metal $Z^1$ of the auxiliary pot.

With the arrangement described, the flame in the burner tube 43 will be constantly maintained when the device is in action and will be adjusted so that it will approximately keep the metal in the auxiliary pot in molten condition at the proper temperature as long as cold metal is not introduced into the same and, during such time, the valve 48, under the control of the expansion rod 52, will cut off the supply of gas to the burner tube 42. When, however, cold metal is put into the auxiliary pot and the temperature of the metal $Z^1$ is reduced, the rod 52 will contract and permit the valve 48 to open and thus throw the burner tube 42 into action to supply the additional heat required to melt the introduced cold metal.

Under the action of the float 23, the valve 20 will be caused to open and close the pot 19 so as to automatically control the flow of molten metal from the auxiliary pot into the main pot and thereby maintain a substantially constant level or altitude of the molten metal Z in the said main pot. Of course, all of the dross and dirt that collects in the melting of cold or old metal will be accumulated on the surface of the metal $Z^1$ in the auxiliary pot and will never reach the main pot. With the delivery end of the tube 18 extended down into the main melting pot, overflowing of the molten metal Z in the main pot is prevented under the following conditions: Suppose, for example, that the burners of the main melting pot are cut off and the metal Z, solidifying, anchors the float 23 while the valve 20 is open and the metal $Z^1$ in the auxiliary pot is still in molten condition—in such case, the metal $Z^1$ would run through the tube 18 until the metal Z in the main melting pot was raised far enough to raise the lower end of said tube, and the metal, solidifying, would close the lower end of said tube and positively prevent the metal in the main pot from overflowing the latter.

To prevent solid metal, thrown into the auxiliary pot from striking the valve 20, said pot is shown as provided with a guard flange $15^a$. To permit the burner tubes 42 and 43 to be lit, the auxiliary pot is shown as provided with a normally closed port $41^a$.

The above described arrangement is highly important because it permits both the constantly and the intermittently operating burners, when in action, to be operated under maximum efficiency. It will, of course, be understood that in a burner of the character above described with a given number of holes, of a certain size and with gas supplied under a certain pressure will operate under maximum efficiency only when properly adjusted in respect to the air supply. Otherwise stated, neither one of the burners would work well under varying supply of air or varying pressure, and the close proximity of burners permits the constantly operating burner to act as a pilot to light the intermittently operating burner. The burners 42 and 43 apply the heat directly to the bottom of the auxiliary pot 15, but considerable heat is radiated and conducted to the metal in the main pot; and moreover, heat conducted or rising from the main pot will not be wasted, but will be utilized to assist in keeping the auxiliary pot at the desired high temperature. The arrangement, therefore, provides the greatest possible economy in the use of heat as well as the highly efficient and desirable arrangement already noted.

What I claim is:

1. The combination with a main melting pot, of an auxiliary pot arranged to deliver into said main pot, a housing structure connecting the two pots as a self-contained unit, a pair of burners arranged below the auxiliary pot and above the main pot, means affording one of the burners a continuous supply, and means affording the other burner an intermittent supply, said latter means including a thermally-actuated controlling valve.

2. The combination with a main melting pot, of an auxiliary pot arranged to deliver into said main pot, a housing structure connecting the two pots as a self-contained unit, a pair of burners arranged below the auxiliary pot and above the main pot, means affording one of the burners a continuous supply, and means affording the other burner an intermittent supply, said latter means including a thermally-actuated controlling valve, the two burners being so closely associated that the flame from the continuously operating burner will afford a pilot for lighting the intermittently operating burner.

3. The structure defined in claim 2 in which said burners comprise parallel perforated tubes and a duplex flame cup and cooperating burner tips.

4. The structure defined in claim 1 in further combination with a burner located below the main pot.

5. The structure defined in claim 2 in which the thermally-actuated valve-controlling means includes a fixed closed tube within the auxiliary pot and an expansion rod movable within said tube.

In testimony whereof I affix my signature.

GEORGE L. CURLE.